United States Patent
Nishimura

(10) Patent No.: US 7,593,171 B2
(45) Date of Patent: Sep. 22, 2009

(54) ZOOM LENS AND IMAGE PICKUP APPARATUS INCLUDING THE SAME

(75) Inventor: Takeshi Nishimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/359,158

(22) Filed: Jan. 23, 2009

(65) Prior Publication Data

US 2009/0190235 A1    Jul. 30, 2009

(30) Foreign Application Priority Data

Jan. 25, 2008    (JP)  ............... 2008-014824

(51) Int. Cl.
*G02B 9/34* (2006.01)
(52) U.S. Cl. ............... 359/781; 359/676; 359/766; 359/771
(58) Field of Classification Search .......... 359/676, 359/766, 771, 781
See application file for complete search history.

(56) References Cited

U.S. PATENT DOCUMENTS 5,710,669 A    1/1998    Endo 7,508,594 B2 *    3/2009    Saori ............ 359/686

FOREIGN PATENT DOCUMENTS

| JP | 10-082954 | 3/1998 |
|---|---|---|
| JP | 10-325923 | 12/1998 |
| JP | 2001-042217 | 2/2001 |
| JP | 2006-058584 | 3/2006 |

* cited by examiner

*Primary Examiner*—Joseph Martinez
(74) *Attorney, Agent, or Firm*—Canon USA Inc IP Div

(57) ABSTRACT

A zoom lens includes first to fourth lens units which respectively have negative, positive, negative, and positive refractive powers in order from the object side to the image side. Distances between the first and second lens units, the second and third lens units, and the third and fourth lens units at the telephoto end are respectively smaller, larger, and smaller than those at the wide-angle end. An Abbe number $\nu 1n$ and a partial dispersion ratio $\theta 1n$ of a material of at least one negative lens included in the first lens unit, an Abbe number $\nu 1p$, a partial dispersion ratio $\theta 1p$, and a refractive index $N1p$, respectively, of a material of at least one positive lens included in the first lens unit, a focal length $f1$ of the first lens unit, and a focal length $fw$ of the entire system at the wide-angle end are adequately set.

7 Claims, 10 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens. The present invention is suitable for, for example, imaging systems for digital cameras, video cameras, and silver-halide film cameras.

2. Description of the Related Art

A so-called negative-lead zoom lens is known in which a lens unit having a negative refractive power is disposed at a position closest to the object side. The negative-lead zoom lens has a small close-up shooting distance, and the field angle and the back focus can be easily increased. Therefore, the negative-lead zoom lens is often used as a wide field angle imaging lens.

A zoom lens including four lens units, which are a lens unit having a negative refractive power, a lens unit having a positive refractive power, a lens unit having a negative refractive power, and a lens unit having a positive refractive power arranged in order from the object side, is known as a negative-lead zoom lens for a single-lens reflex camera (see, for example, U.S. Pat. No. 5,710,669 and Japanese Patent Laid-Open Nos. 2006-58584, 2001-42217, 10-325923, and 10-82954).

Each of these documents describes a wide field angle zoom lens including four lens units, that is, a lens unit having a negative refractive power, a lens unit having a positive refractive power, a lens unit having a negative refractive power, and a lens unit having a positive refractive power arranged in order from the object side to the image side. The wide field angle zoom lens performs zooming by moving each of the lens units.

U.S. Pat. No. 5,710,669 describes a zoom lens having a super wide angle range in which the field angle is about 100° at the wide-angle end.

According to Japanese Patent Laid-Open No. 2006-58584, a first lens unit includes three negative lenses and a positive lens. Thus, a zoom lens having improved optical performance and a super wide angle range in which the imaging field angle is 110° or more is provided.

Recently, there has been an increasing demand for zoom lenses with wide field angle and high image quality for use in digital single-lens reflex cameras.

In general, although the negative-lead zoom lens is advantageous in increasing the field angle, they have a problem that the lens structure is very asymmetric.

Therefore, when each lens unit is moved during zooming, aberrations largely vary due to the asymmetric lens structure, and it is extremely difficult to obtain high optical performance over the entire zooming range.

In particular, in a zoom lens including a lens unit having a negative refractive power, a lens unit having a positive refractive power, a lens unit having a negative refractive power, and a lens unit having a positive refractive power in order from the object side to the image side, it is difficult to obtain a wide field angle and high optical performance over the entire zooming range unless the first lens unit, which is closest to the object side, has a suitable lens structure.

For example, if an Abbe number or a partial dispersion ratio of a material of each lens included in the first lens unit is not suitable, large chromatic aberration of magnification occurs at the wide-angle end. In addition, the chromatic aberration of magnification largely varies over the entire zooming range, and it is difficult to correct the chromatic aberration of magnification.

SUMMARY OF THE INVENTION

The present invention provides a zoom lens having a wide field angle and high optical performance over the entire zooming range.

According to an aspect of the present invention, a zoom lens includes a first lens unit having a negative refractive power; a second lens unit having a positive refractive power; a third lens unit having a negative refractive power; and a fourth lens unit having a positive refractive power. The first lens unit, the second lens unit, the third lens unit, and the fourth lens unit are arranged in order from the object side to the image side. A distance between the first lens unit and the second lens unit at the telephoto end is smaller than that at the wide-angle end, a distance between the second lens unit and the third lens unit at the telephoto end is larger than that at the wide-angle end, and a distance between the third lens unit and the fourth lens unit at the telephoto end is smaller than that at the wide-angle end. The following conditions are satisfied:

$$v1n > 70$$

$$\theta 1n - (0.651 - 0.00168 \cdot v1n) > 0$$

$$25 < v1p < 50$$

$$\theta 1p - (0.644 - 0.00168 \cdot v1p) < 0$$

$$-0.2 < N1p - 1.77 < 0$$

$$1.2 < |f1/fw| < 1.6$$

where $v1n$ and $\theta 1n$ are an Abbe number and a partial dispersion ratio, respectively, of a material of at least one negative lens included in the first lens unit, $v1p$, $\theta 1p$, and $N1p$ are an Abbe number, a partial dispersion ratio, and a refractive index, respectively, of a material of at least one positive lens included in the first lens unit, f1 is a focal length of the first lens unit, and fw is a focal length of the entire zoom lens at the wide-angle end.

Further features of the present invention will become apparent from the following description of exemplary embodiments with reference to the attached drawings.

DESCRIPTION OF THE EMBODIMENTS

Zoom lenses according to embodiments of the present invention and an image pickup apparatus including a zoom lens according to at least one embodiment will be described with reference to the drawings.

Each of the zoom lenses according to the embodiments of the present invention includes a first lens unit having a negative refractive power, a second lens unit having a positive refractive power, a third lens unit having a negative refractive power, and a fourth lens unit having a positive refractive power in order from the object side to the image side.

The lens units move such that the distance between the first lens unit and the second lens unit at the telephoto end is smaller than that at the wide-angle end, the distance between the second lens unit and the third lens unit at the telephoto end is larger than that at the wide-angle end, and the distance between the third lens unit and the fourth lens unit at the telephoto end is smaller than that at the wide-angle end.

In each of the embodiments, a four-unit zoom lens including four lens units is described. However, each of the zoom lenses according to the embodiments of the present invention can also include five or more lens units in which one or more lens units are disposed on the image side of the fourth lens unit.

Figure 1:
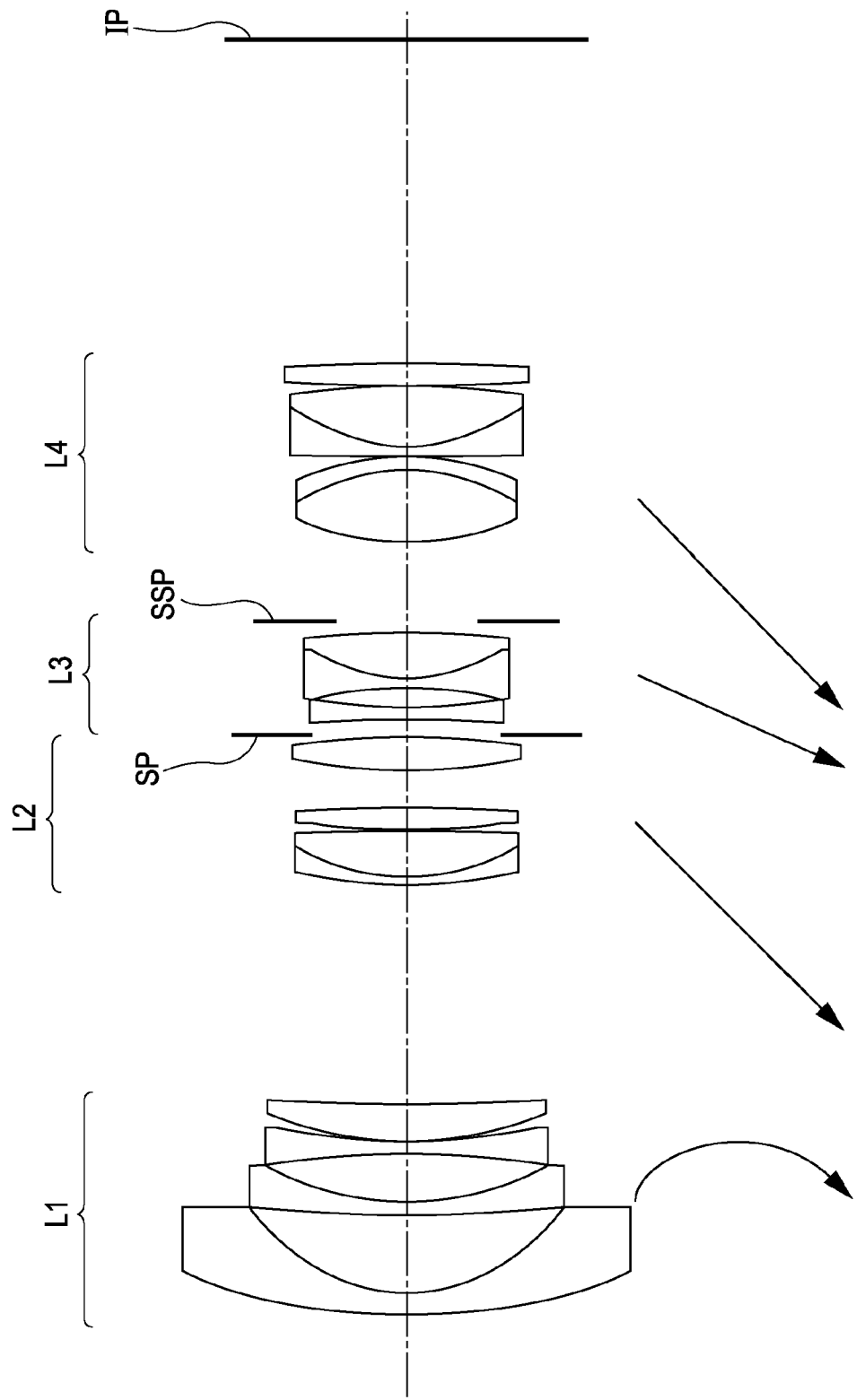
FIG. 1 is a sectional view of a zoom lens according to a first embodiment at the wide-angle end.

FIG. 1 is a sectional view of a zoom lens according to a first embodiment of the present invention at the wide-angle end (short-focal-length end).

Figure 2:
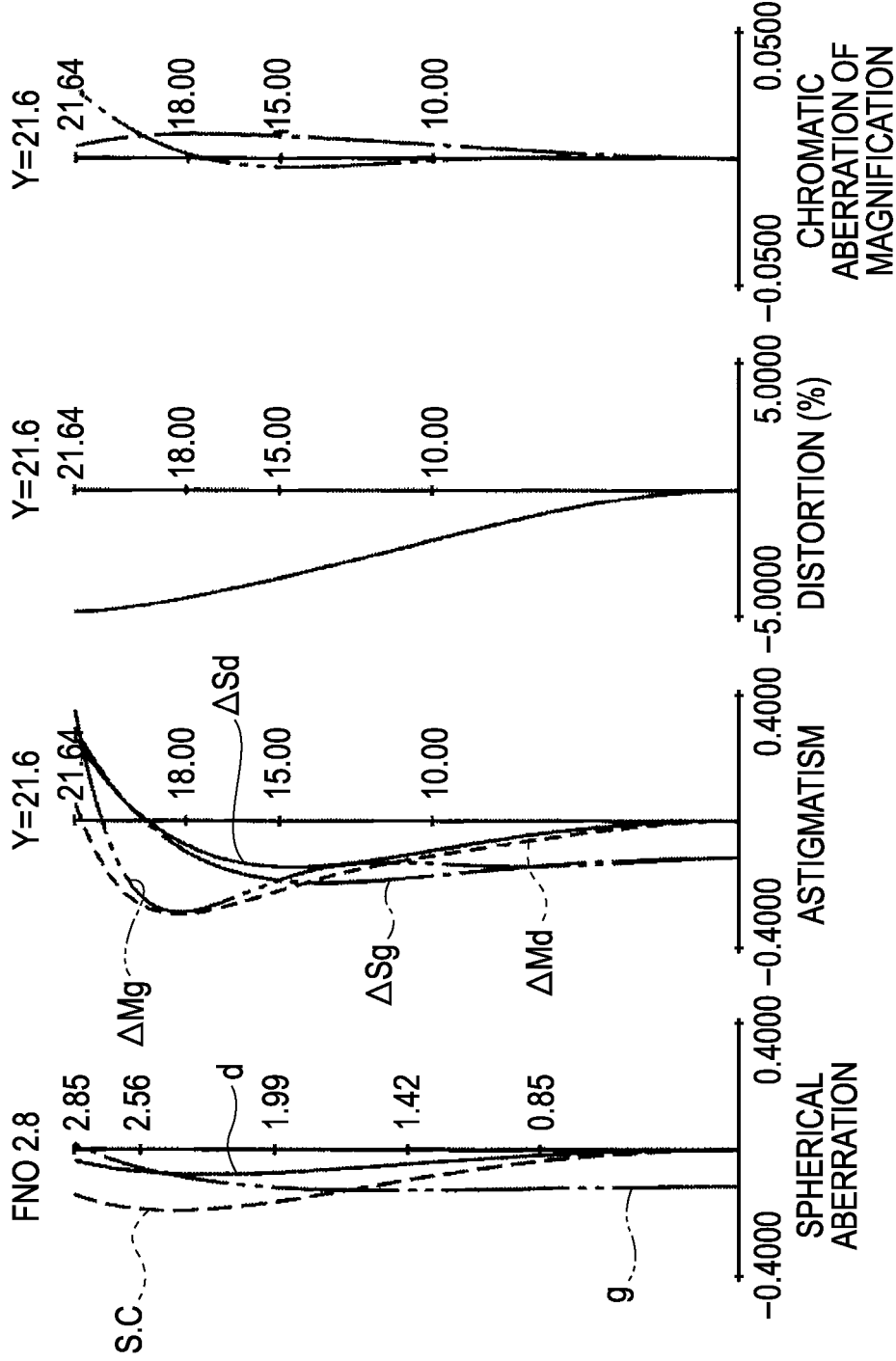
FIG. 2 illustrates aberration diagrams of the zoom lens according to the first embodiment at the wide-angle end when the object distance is infinity.
Figure 3:
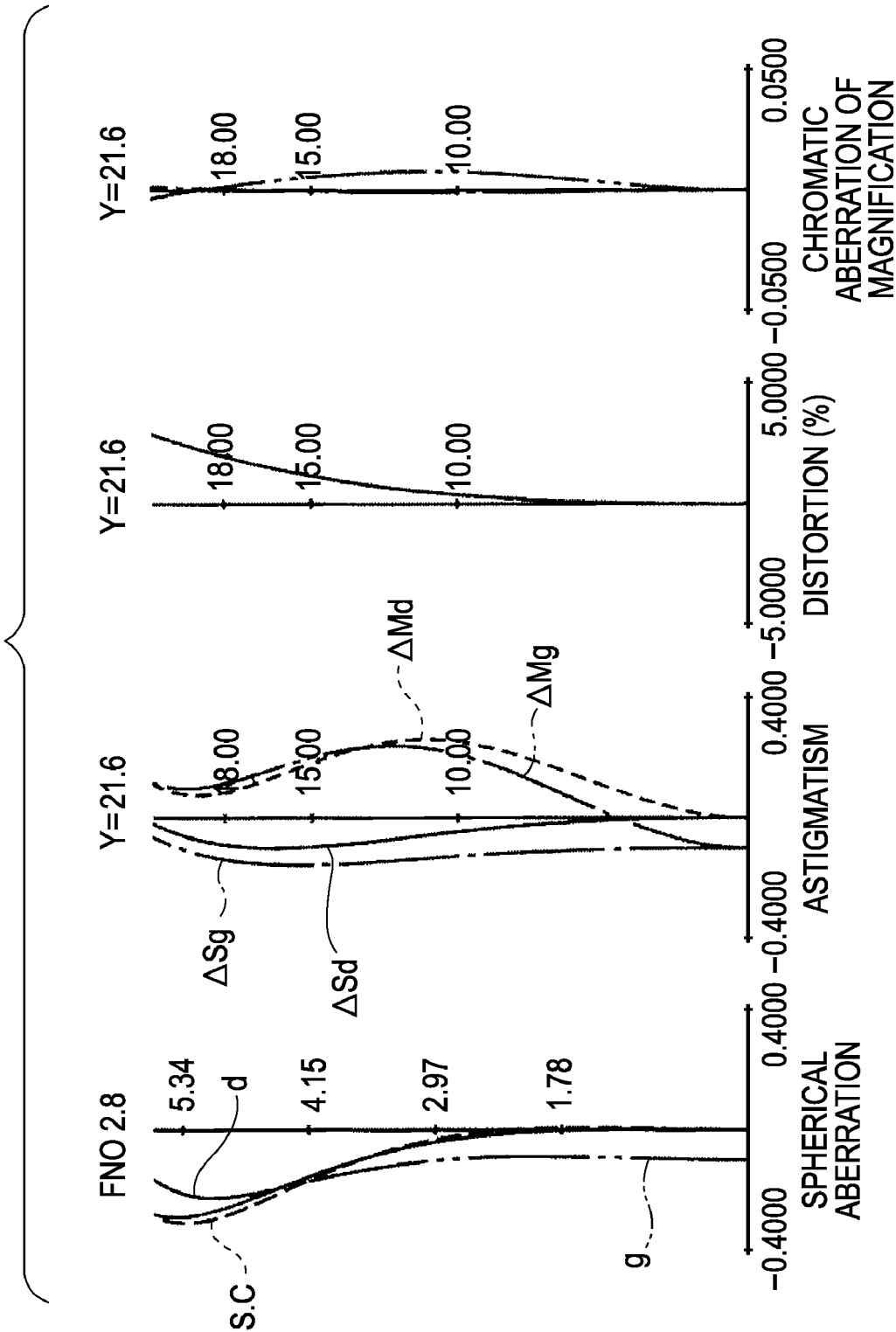
FIG. 3 illustrates aberration diagrams of the zoom lens according to the first embodiment at the telephoto end when the object distance is infinity.

FIGS. 2 and 3 illustrate aberration diagrams of the zoom lens according to the first embodiment at the wide-angle end and the telephoto end (long-focal-length end), respectively, when the object distance is infinity.

Figure 4:
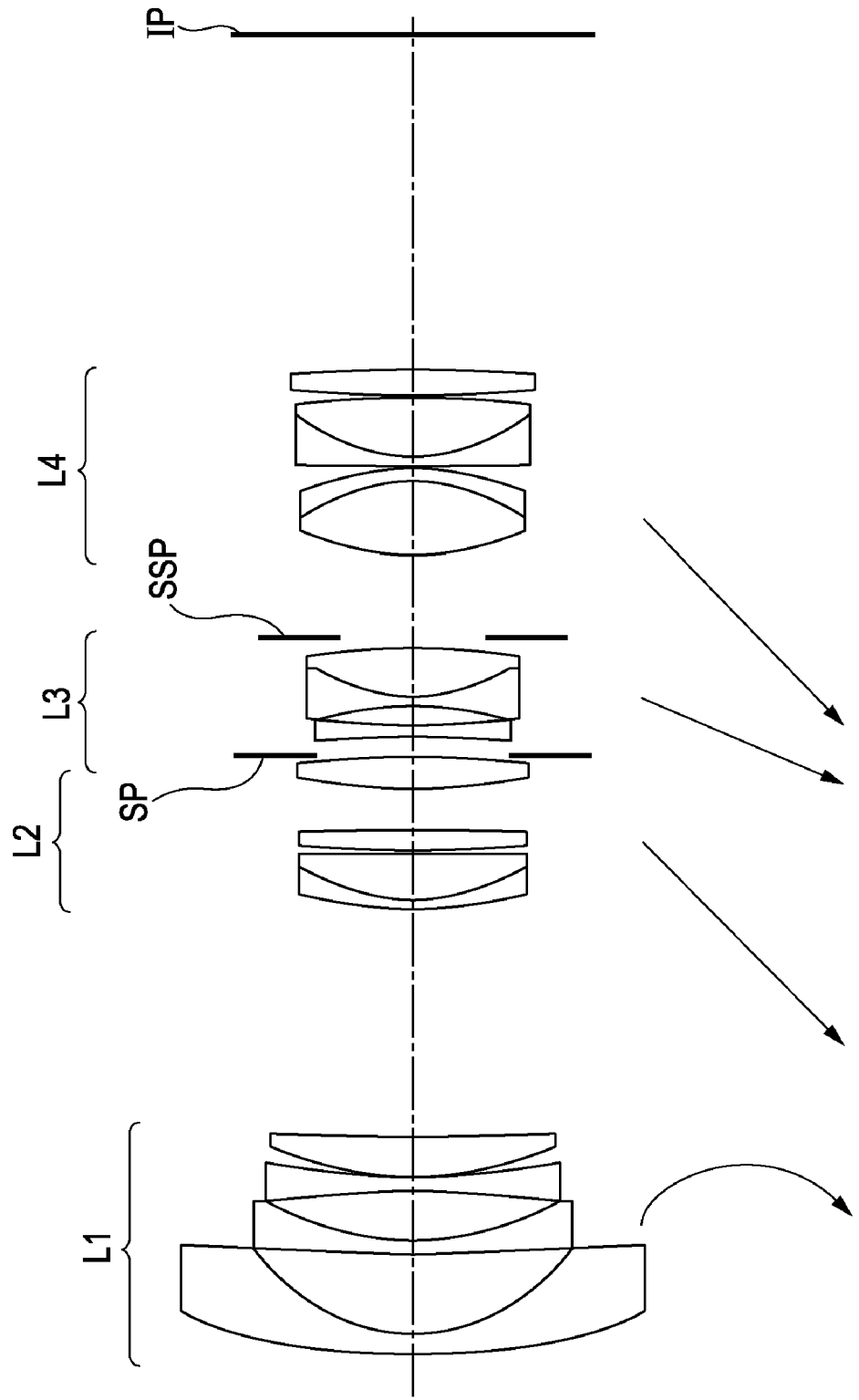
FIG. 4 is a sectional view of a zoom lens according to a second embodiment at the wide-angle end.

FIG. 4 is a sectional view of a zoom lens according to a second embodiment of the present invention at the wide-angle end.

Figure 5:
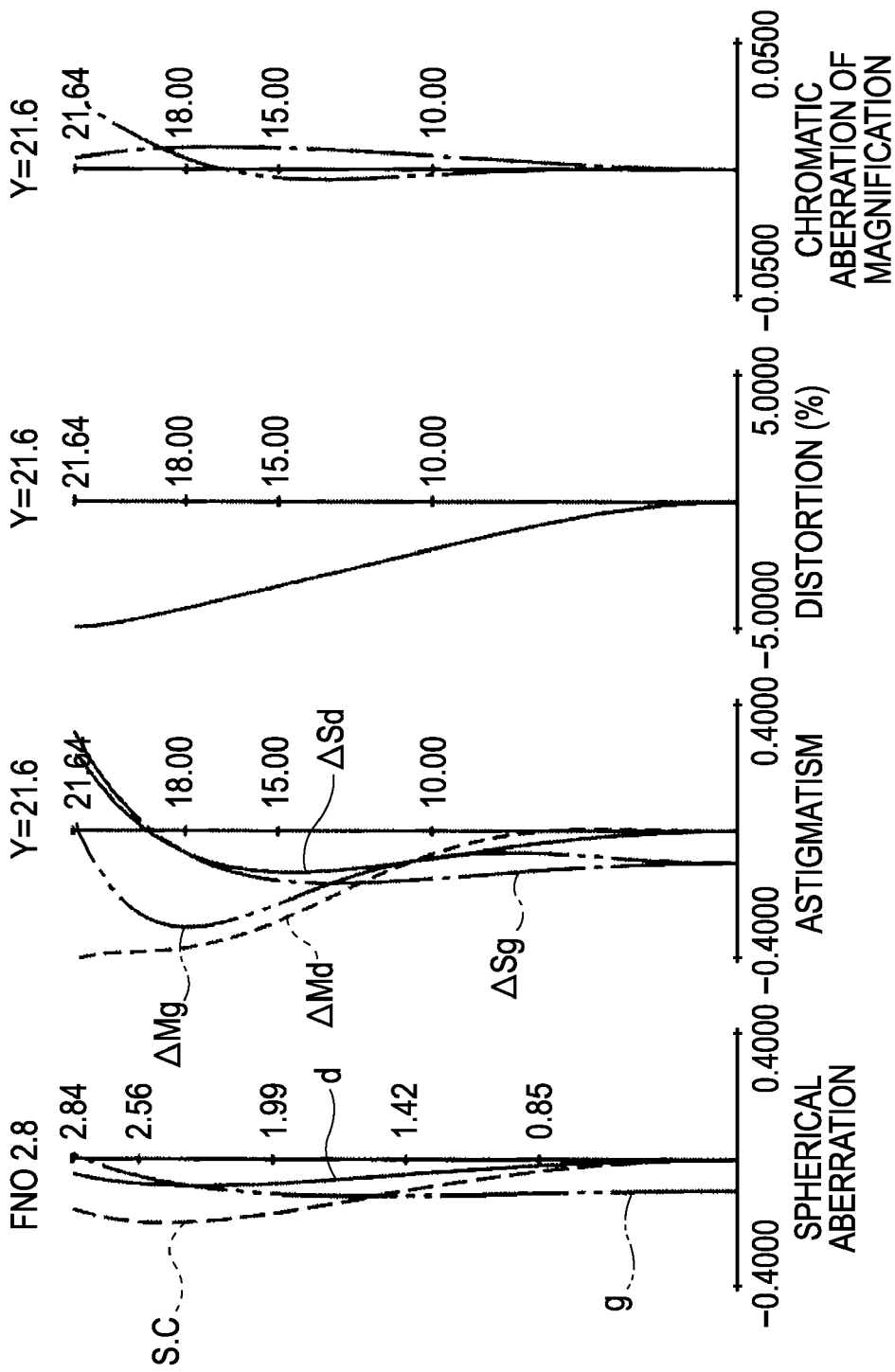
FIG. 5 illustrates aberration diagrams of the zoom lens according to the second embodiment at the wide-angle end when the object distance is infinity.
Figure 6:
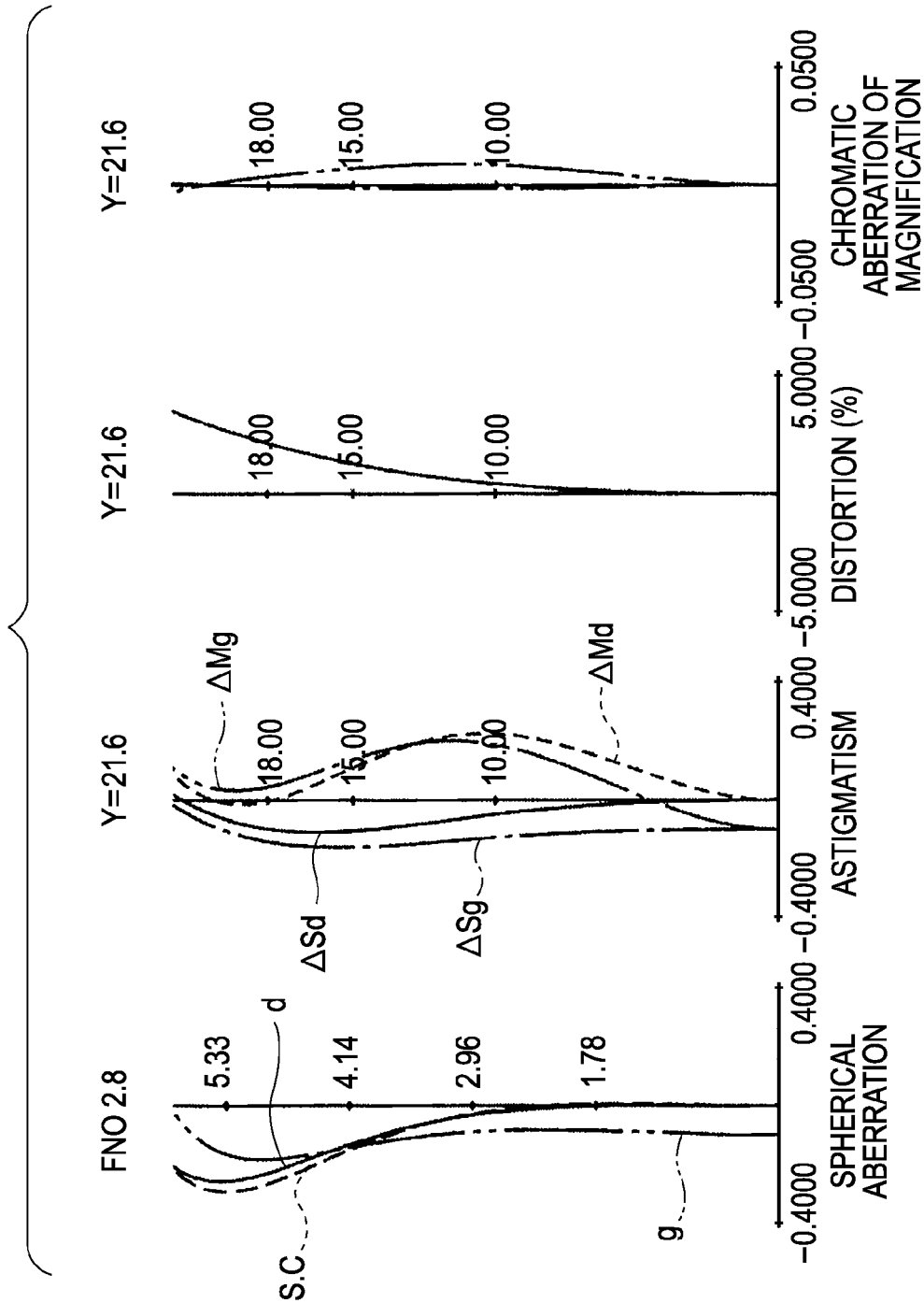
FIG. 6 illustrates aberration diagrams of the zoom lens according to the second embodiment at the telephoto end when the object distance is infinity.

FIGS. 5 and 6 illustrate aberration diagrams of the zoom lens according to the second embodiment at the wide-angle end and the telephoto end, respectively, when the object distance is infinity.

Figure 7:
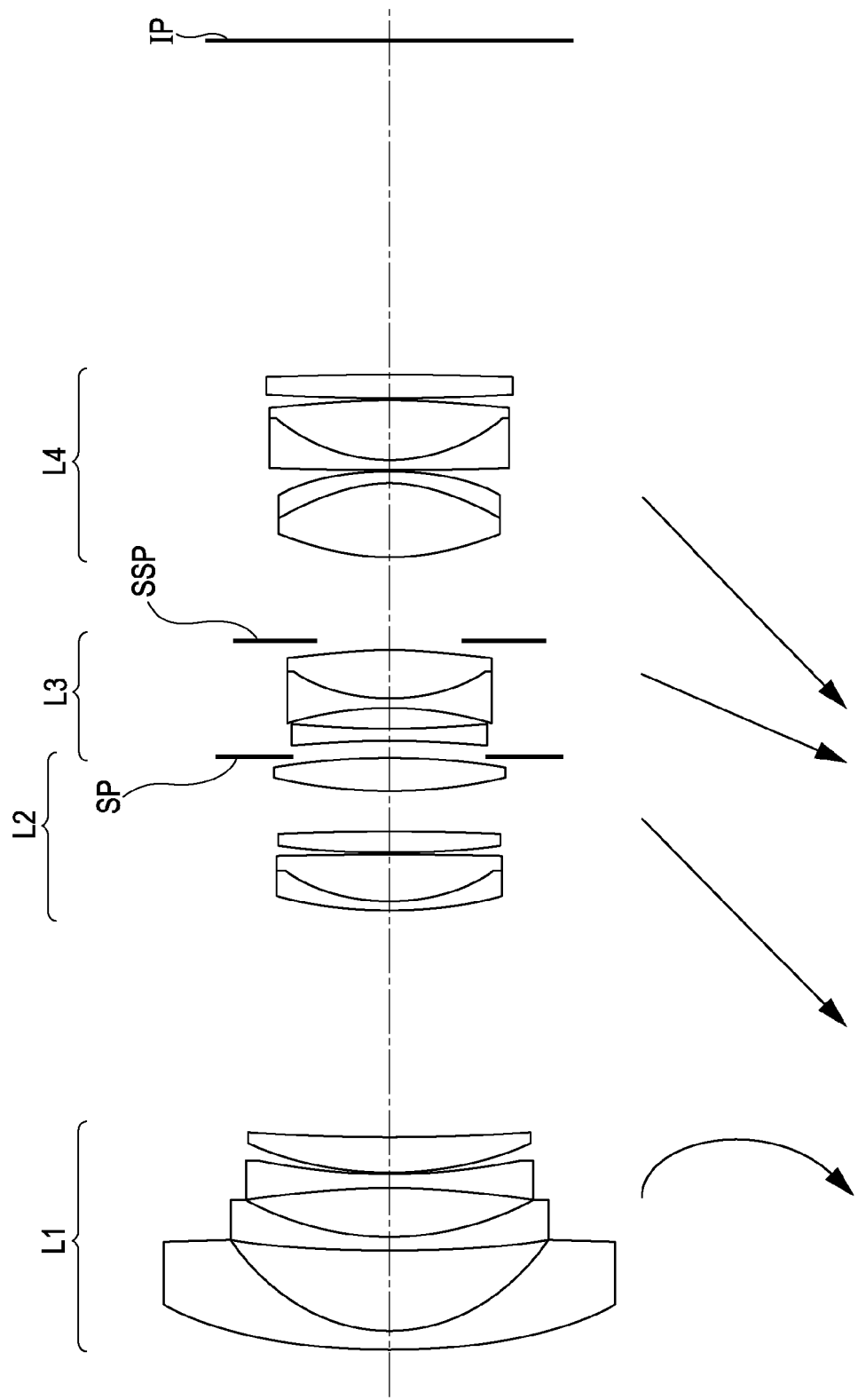
FIG. 7 is a sectional view of a zoom lens according to a third embodiment at the wide-angle end.

FIG. 7 is a sectional view of a zoom lens according to a third embodiment of the present invention at the wide-angle end.

Figure 8:
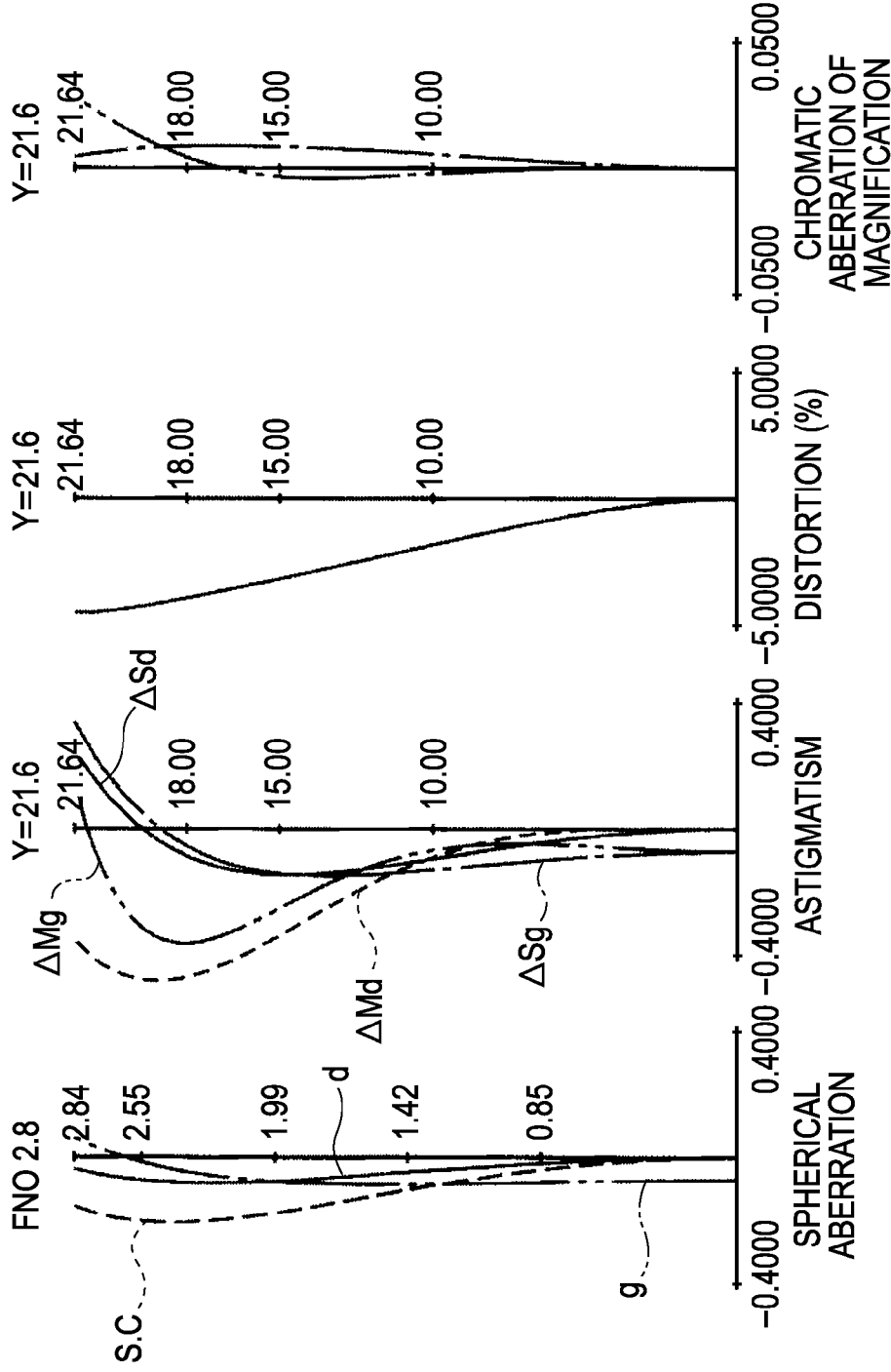
FIG. 8 illustrates aberration diagrams of the zoom lens according to the third embodiment at the wide-angle end when the object distance is infinity.
Figure 9:
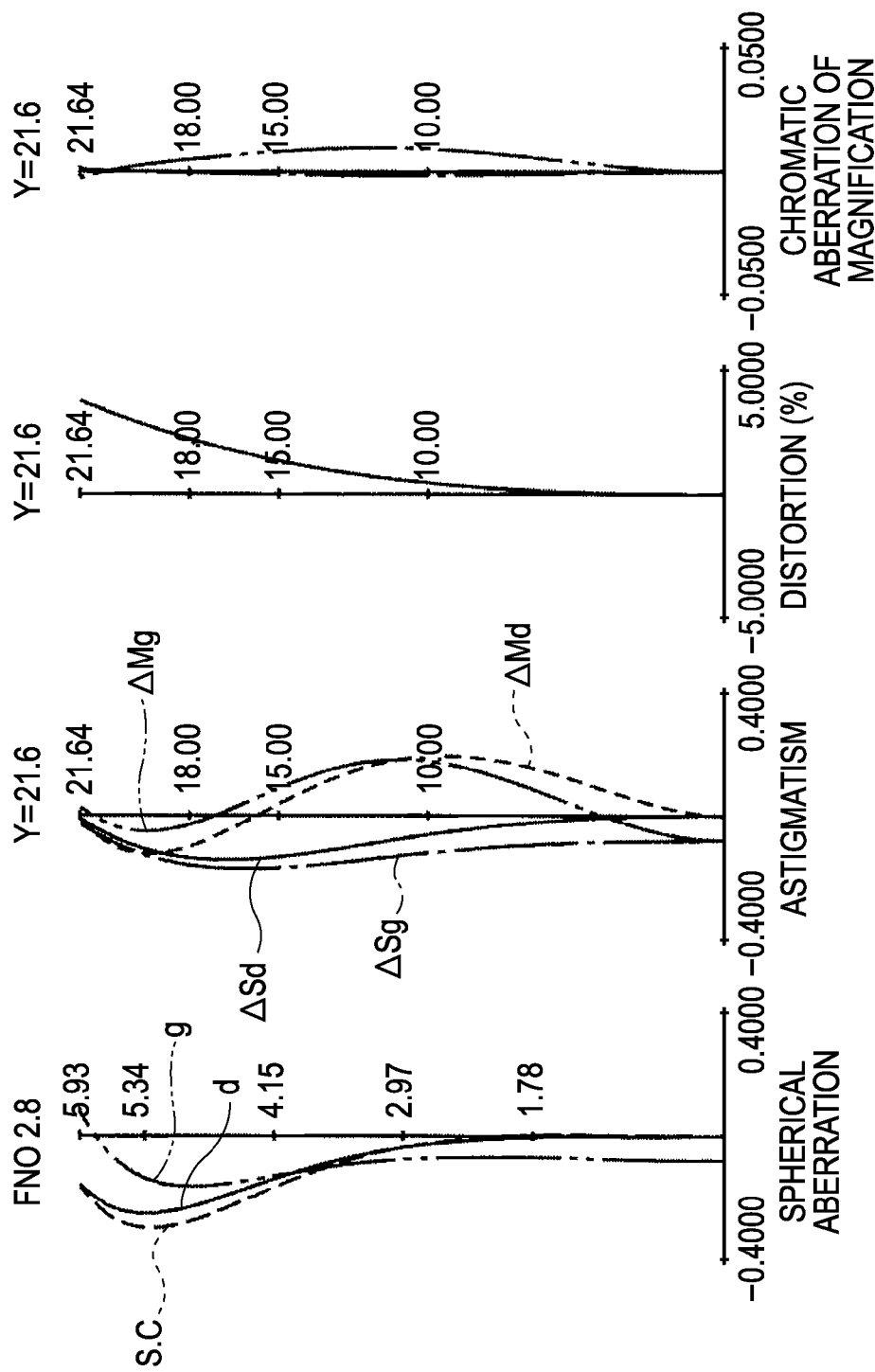
FIG. 9 illustrates aberration diagrams of the zoom lens according to the third embodiment at the telephoto end when the object distance is infinity.

FIGS. 8 and 9 illustrate aberration diagrams of the zoom lens according to the third embodiment at the wide-angle end and the telephoto end, respectively, when the object distance is infinity.

Figure 10:
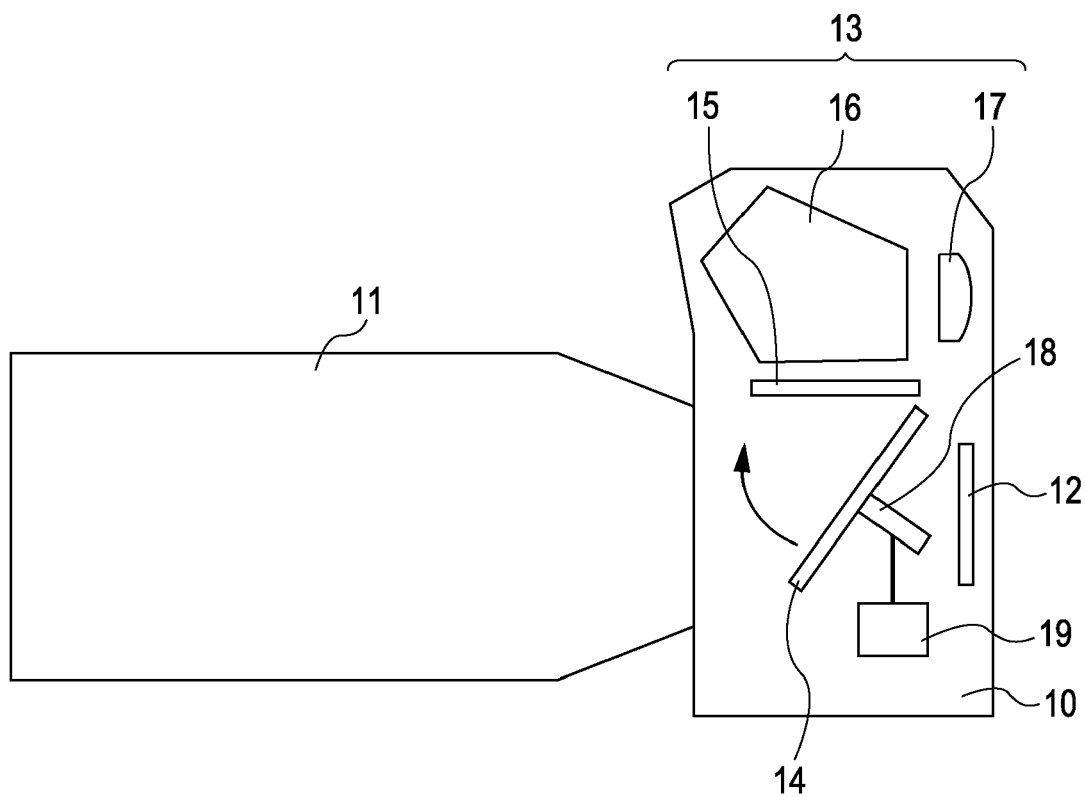
FIG. 10 is a schematic diagram illustrating the main part of an image pickup apparatus according to an embodiment of a present invention.

FIG. 10 is a schematic diagram illustrating the main part of a single-lens reflex camera (image pickup apparatus) including a zoom lens according to an embodiment of the present invention.

The zoom lens according to each embodiment is an imaging lens system (optical system) included in an image pickup apparatus, such as a video camera, a digital camera, or a silver-halide film camera. In each sectional view, the left side shows the object side (front) and the right side shows the image side (rear). In addition, i denotes the number of each lens unit counted from the object side, and Li denotes the $i^{th}$ lens unit. SP denotes an aperture stop, and SSP denotes an open-Fno stop (open-F-number stop) which regulates an open F number.

IP denotes an image plane. In the case where the zoom lens is used as an imaging optical system of a video camera or a digital still camera, an image pickup plane of a solid-state image pickup element (photoelectric conversion element), such as a CCD sensor and a CMOS sensor, corresponds to the image plane IP. In the case where the zoom lens is used in a silver-halide film camera, a film surface corresponds to the image plane IP.

In the aberration diagrams, d and g denote the d-line and the g-line, respectively, and S.C denotes the sine condition. $\Delta$Md and $\Delta$Sd denote a meridional image plane and a sagittal image plane, respectively, for the d-line. $\Delta$Mg and $\Delta$Sg denote a meridional image plane and a sagittal image plane, respectively, for the g-line. With regard to the chromatic aberration of magnification, the chromatic aberration of magnification for the g-line is shown. FNO denotes the F-number and Y denotes the image height.

In each embodiment, the wide-angle end and the telephoto end are zooming positions corresponding to the states in which the magnification-varying lens unit is at one and other ends of a mechanically moveable range along an optical axis.

In each embodiment, a first lens unit L1 having a negative refractive power, a second lens unit L2 having a positive refractive power, a third lens unit L3 having a negative refractive power, and a fourth lens unit L4 having a positive refractive power are arranged in order from the object side to the image side.

A converter lens or an afocal lens unit may be disposed on the object side of the first lens unit or on the image side of the fourth lens unit.

During zooming from the wide-angle end to the telephoto end, the lens units L1 to L4 move along the optical axis as shown by the arrows so that the distances between the lens units L1 to L4 change.

More specifically, the distances between the lens units at the wide-angle end and the telephoto end are set as follows. That is, the air distance between the first lens unit L1 and the second lens unit L2 at the telephoto end is smaller than that at the wide-angle end. The air distance between the second lens unit L2 and the third lens unit L3 at the telephoto end is larger than that at the wide-angle end. The air distance between the third lens unit L3 and the fourth lens unit L4 at the telephoto end is smaller than that at the wide-angle end.

The first lens unit L1 moves along a locus that is convex toward the image side. The second to fourth lens units L2 to L4 move toward the object side.

The aperture stop SP and the open-F-number stop SSP move together with the third lens unit L3 during zooming.

In each embodiment, the second lens unit L2 and the fourth lens unit L4 are moved together during zooming so that the mechanism can be simplified. However, the second lens unit L2 and the fourth lens unit L4 may also be moved independently.

In each embodiment, due to the above-described structure, the entire lens system has a retrofocus-type refractive power distribution at the wide-angle end. Therefore, the field angle can be effectively increased at the wide-angle end.

In addition, the image-plane variation caused by the variation in magnification is corrected by moving the first lens unit L1 along a nonlinear locus during zooming.

In each embodiment, $\nu$1n and $\theta$1n are an Abbe number and a partial dispersion ratio, respectively, of a material of at least one negative lens included in the first lens unit L1. In addition, $\nu$1p, $\theta$1p, and N1p are an Abbe number, a partial dispersion ratio, and a refractive index, respectively, of a material of at least one positive lens included in the first lens unit L1. In addition, f1 is a focal length of the first lens unit L1, and fw is a focal length of the entire system at the wide-angle end.

Here, the following expressions are satisfied:

$$v1n > 70 \tag{1}$$

$$\theta 1n - (0.651 - 0.00168 \cdot v1n) > 0 \tag{2}$$

$$25 < v1p < 50 \tag{3}$$

$$\theta 1p - (0.644 - 0.00168 \cdot v1p) < 0 \tag{4}$$

$$-0.2 < N1p - 1.77 < 0 \tag{5}$$

$$1.2 < |f1/fw| < 1.6 \tag{6}$$

In the zoom lens of each embodiment, the back focus must be sufficiently long relative to the focal length at the wide-angle end. Therefore, the first lens unit L1 is positioned closer to the object side with respect to the second lens unit L2 so that the image-side principal point can be positioned closer to the image side.

In each embodiment, the overall length of the entire system (distance between the first lens surface and the last lens surface) at the telephoto end is reduced. To reduce the overall length, the distance between the first lens unit L1 and the second lens unit L2 and the distance between the third lens unit L3 and the fourth lens unit L4 are reduced so that the image-side principal point can be positioned closer to the object side.

In a wide field angle zoom lens, the effective diameter of the first lens unit tends to increase. In addition, if the refractive power of the first lens unit is increased to reduce the overall size of the system, large chromatic aberration of magnification easily occurs.

Therefore, according to each embodiment, Conditional Expressions (1) to (6) are satisfied to adequately correct aberrations, in particular, the chromatic aberration of magnification without increasing the size of the entire system.

The technical meaning of each of Conditional Expressions (1) to (6) will now be described.

Conditional Expression (1) relates to the Abbe number of the material of at least one negative lens included in the first lens unit L1, and is set to adequately correct, in particular, the chromatic aberration of magnification at the wide-angle end.

In the wide field angle zoom lens, light rays pass through the lens surface of the first lens unit L1 at a position relatively distant from the axis of the lens surface, that is, at a high incidence position. Therefore, the first lens unit L1 largely affects the off-axis aberration. If the value of Conditional Expression (1) is less than the lower limit thereof, the chromatic aberration of magnification (g-line) increases in the negative direction particularly at the wide-angle end.

Conditional Expression (2) relates to the partial dispersion ratio and the Abbe number of at least one negative lens included in the first lens unit L1. Similar to Conditional Expression (1), Conditional Expression (2) is also set to adequately correct the chromatic aberration of magnification at the wide-angle end. If the value of Conditional Expression (2) is less than the lower limit thereof, the chromatic aberration of magnification for each wavelength increases at the wide-angle end.

Conditional Expression (3) relates to the Abbe number of the material of at least one positive lens included in the first lens unit L1, and is set to adequately correct, in particular, the chromatic aberration of magnification at the wide-angle end. If the value of Conditional Expression (3) is less than the lower limit thereof, the chromatic aberration of magnification (g-line) excessively increases in the positive direction at the wide-angle end, and it is difficult to adequately correct the chromatic aberration of magnification. If the value of Conditional Expression (3) is greater than the upper limit thereof, the chromatic aberration of magnification (g-line) excessively increases in the negative direction at the wide-angle end and it is difficult to adequately correct the chromatic aberration of magnification.

Conditional Expression (4) relates to the partial dispersion ratio and the Abbe number of at least one positive lens included in the first lens unit L1. Similar to Conditional Expression (3), Conditional Expression (4) is also set to adequately correct the chromatic aberration of magnification at the wide-angle end. If the value of Conditional Expression (4) is less than the lower limit thereof, the chromatic aberration of magnification for each wavelength increases at the wide-angle end.

Conditional Expression (5) relates to the refractive power of the material of the positive lens in the first lens unit L1, and is set mainly to adequately correct the image-plane characteristics. If the refractive index of the material of the positive lens is too low and the value of Conditional Expression (5) is less than the lower limit thereof, the image-plane characteristics are degraded and the image plane tends to be under-corrected. Thus, it is difficult to perform adequate correction.

If the refractive index of the material of the positive lens is too high and the value of Conditional Expression (5) is greater than the upper limit thereof, the image-plane characteristics are degraded and the image plane tends to be under-corrected. Thus, it is difficult to perform adequate correction.

Conditional Expression (6) relates to the ratio of the focal length of the entire system at the wide-angle end to the focal length of the first lens unit L1, and is set mainly to reduce the size of the entire system and to adequately correct distortion at the wide-angle end.

If the refractive power of the first lens unit L1 is too low and the value of Conditional Expression (6) is greater than the upper limit thereof, the effective diameter of the first lens unit, which has the largest lens diameter in the entire system, increases.

If the refractive power of the first lens unit L1 is too high and the value of Conditional Expression (6) is less than the lower limit thereof, the negative distortion generated at the first lens unit L1 increases and it is difficult to adequately correct the distortion.

In each embodiment, a wide field angle zoom lens in which the chromatic aberration of magnification is adequately corrected is obtained by setting the lens structure as described above and satisfying Conditional Expressions (1) to (6).

In each embodiment, the numerical values or the numerical ranges of Conditional Expressions (1) to (6) can also be set as follows:

$$v1n > 80 \tag{1a}$$

$$\theta 1n - (0.651 - 0.00168 \cdot v1n) > 0.01 \tag{2a}$$

$$30 < v1p < 40 \tag{3a}$$

$$\theta 1p - (0.644 - 0.00168 \cdot v1p) < -0.005 \tag{4a}$$

$$-0.15 < N1p - 1.77 < -0.01 \tag{5a}$$

$$1.3 < |f1/fw| < 1.5 \tag{6a}$$

As described above, according to each embodiment, a wide field angle zoom lens can be provided in which an imaging field angle is more than 100° at the wide-angle end, a zoom ratio is about 2, and the F-number is about 2.8. The zoom lens has good optical performance, and the chromatic aberrations are adequately corrected.

According to the present invention, at least one of the following conditions can be additionally satisfied. In such a case, effects corresponding to the conditions can be obtained.

Here, ν4p and θ4p are an Abbe number and a partial dispersion ratio, respectively, of a material of at least one positive lens included in the fourth lens unit L4.

In addition, f1 and f2 are the focal lengths of the first lens unit L1 and the second lens unit L2, respectively.

The fourth lens unit L4 has an aspherical surface that is shaped such that the negative refractive power decreases from the center of the lens toward the periphery thereof. Here, f4 is a focal length of the fourth lens unit L4.

In this case, one or more of the following conditions can be satisfied:

$$\nu 4p > 75 \quad (7)$$

$$\theta 4p - (0.651 - 0.00168 \cdot \nu 4p) > 0 \quad (8)$$

$$0.4 < |f1/f2| < 0.9 \quad (9)$$

$$0.2 < fw/f4 < 0.5 \quad (10)$$

The technical meaning of each of Conditional Expressions (7) to (10) will now be described.

Conditional Expression (7) relates to the Abbe number of the material of at least one positive lens included in the fourth lens unit L4, and is set mainly to adequately correct the chromatic aberration of magnification.

If the value of Conditional Expression (7) is less than the lower limit thereof, the chromatic aberration of magnification (g-line) increases in the negative direction particularly at the wide-angle end and it is difficult to correct the chromatic aberration of magnification.

Conditional Expression (8) relates to the partial dispersion ratio and the Abbe number of the material of at least one positive lens included in the fourth lens unit L4, and is set to adequately correct, in particular, the chromatic aberration of magnification at the wide-angle end. If the value of Conditional Expression (8) is less than the lower limit thereof, the chromatic aberration of magnification is increased particularly at the wide-angle end.

Conditional Expression (9) relates to the ratio of the focal length of the first lens unit L1 to the focal length of the second lens unit L2, and is set to provide good optical performance while reducing the size of the first lens unit L1.

If the value of Conditional Expression (9) is less than the lower limit thereof, the refractive power of the first lens unit L1 is too high compared to that of the second lens unit L2 and the distortion increases particularly at the wide-angle end. If the value of Conditional Expression (9) is greater than the upper limit thereof, the refractive power of the first lens unit L1 is too low compared to that of the second lens unit L2 and the effective diameter of the first lens unit L1 increases.

The fourth lens unit L4 has a positive refractive power. In the wide field angle zoom lens, power distribution must be set such that a long back focus can be obtained at the wide-angle end.

If the refractive power of the fourth lens unit L4 is increased so that a long back focus can be obtained, the aberrations increase. Therefore, the fourth lens unit L4 has an aspherical surface shaped such that the negative refractive power decreases from the center of the lens toward the periphery thereof. Accordingly, the distortion and field curvature at the wide-angle end can be adequately corrected.

In addition, the refractive power of the fourth lens unit L4 can be adequately set so as to satisfy Conditional Expression (10).

If the refractive power of the fourth lens unit L4 is too low and the value of Conditional Expression (10) is less than the lower limit thereof, it is difficult to obtain a long back focus at the wide-angle end.

If the refractive power of the fourth lens unit L4 is too high and the value of Conditional Expression (10) is greater than the upper limit thereof, it is difficult to adequately correct the variations in the spherical aberration and the field curvature during zooming.

In each embodiment, the numerical ranges of Conditional Expressions (7) to (10) can also be set as follows:

$$\nu 4p > 80 \quad (7a)$$

$$\theta 4p - (0.651 - 0.00168 \cdot \nu 4p) > 0.01 \quad (8a)$$

$$0.5 < |f1/f2| < 0.8 \quad (9a)$$

$$0.3 < fw/f4 < 0.4 \quad (10a)$$

In each embodiment, the first lens unit L1 has a high negative refractive power. Therefore, the negative distortion increases particularly at the wide-angle end and it is difficult to adequately correct the distortion. Therefore, to adequately correct the distortion, the first lens unit L1 can have an aspherical surface shaped such that the negative refractive power decreases from the optical axis (center of the lens) toward the periphery thereof.

Accordingly, the distortion at the wide-angle end can be adequately corrected.

In each embodiment, the first lens unit L1 can include four lenses including a negative lens, a negative lens, a negative lens, and a positive lens in order from the object side to the image side. The first lens unit L1 has a high negative refractive power, and the negative refractive power can be provided by a plurality of negative lenses. In such a case, the coma aberration and the field curvature can be easily corrected at the wide-angle end. However, if the number of negative lenses is further increased, the effective diameter of the lens that is closest to the object side increases.

In each embodiment, the second lens unit L2 includes a cemented lens including a negative meniscus lens having a convex surface on the image side and a positive lens and two biconvex lenses in order from the object side to the image side.

The third lens unit L3 includes a biconcave negative lens and a cemented lens including a biconcave negative lens and a biconvex positive lens in order from the object side to the image side.

The fourth lens unit L4 includes a cemented lens including a biconvex positive lens and a negative lens, a cemented lens including a negative lens and a positive lens, and a biconvex positive lens in order from the object side to the image side.

When the lens units are structured as described above, variations in various aberrations during zooming can be reduced and high optical performance can be obtained over the entire zooming area.

Although the embodiments of the present invention have been described above, the present invention is, of course, not limited to the embodiments, and various modifications are possible within the scope of the present invention.

First to third numerical examples corresponding to the first to third embodiments will now be described. In each numerical example, i denotes the surface number counted from the object side and Ri denotes the radius of curvature of the $i^{th}$ lens surface. Di denotes the lens thickness or air distance between the $i^{th}$ lens surface and the $(i+1)^{th}$ lens surface. Ni, νi, and θi respectively denote the refractive index, the Abbe number, and the partial dispersion ratio with respect to the d line. BF denotes the back focus. When X is the position of the aspherical surface in the optical axis direction with respect to the vertex of the aspherical surface at a height h from the optical axis, the shape of the aspherical surface is expressed as follows:

$$X = \frac{(1/R)H^2}{1+\sqrt{1-(H/R)^2}} + AH^2 = BH^4 + CH^6 + DH^8 + EH^{10} + FH^{12}$$

In the above equation, R is a paraxial radius of curvature and A, B, C, D, E, and F are aspherical coefficients. In addition, "e-X" indicates "×10$^{-x}$". In addition, f is the focal length and ω is the half field angle. Table 7 provided below shows the relationship between the above-described conditional expressions and the corresponding values in each numerical example.

First Numerical Example

TABLE 1

| | | | |
|---|---|---|---|
| f | 16.31 | 24.21 | 33.91 |
| F-number | 2.9 | 2.9 | 2.9 |
| Field Angle 2ω | 105.9 | 83.5 | 65.0 |
| Image Height | 21.6 | 21.6 | 21.6 |
| Lens Length | 113.6 | 98.9 | 89.9 |
| BF | 38.6 | 45.7 | 55.6 |

| | | | | |
|---|---|---|---|---|
| *R1 = 314.635 | D1 = 2.40 | N1 = 1.772499 | ν1 = 49.6 | θ1 = 0.552 |
| *R2 = 21.920 | D2 = 9.27 | | | |
| R3 = 165.989 | D3 = 1.60 | N2 = 1.772499 | ν2 = 49.6 | θ2 = 0.552 |
| R4 = 36.447 | D4 = 0.16 | N3 = 1.516400 | ν3 = 52.2 | θ3 = 0.557 |
| *R5 = 46.186 | D5 = 5.51 | | | |
| R6 = −91.862 | D6 = 1.60 | N4 = 1.496999 | ν4 = 81.5 | θ4 = 0.538 |
| R7 = 78.171 | D7 = 0.15 | | | |
| R8 = 41.465 | D8 = 4.50 | N5 = 1.749500 | ν5 = 35.3 | θ5 = 0.552 |
| R9 = 323.873 | D9 = Variable | | | |
| R10 = 55.242 | D10 = 1.00 | N6 = 1.805181 | ν6 = 25.4 | θ6 = 0.563 |
| R11 = 24.400 | D11 = 5.40 | N7 = 1.540720 | ν7 = 47.2 | θ7 = 0.565 |
| R12 = −378.684 | D12 = 0.15 | | | |
| R13 = 101.412 | D13 = 2.55 | N8 = 1.804000 | ν8 = 46.6 | θ8 = 0.557 |
| R14 = −207.998 | D14 = 4.58 | | | |
| R15 = 59.525 | D15 = 4.00 | N9 = 1.622992 | ν9 = 58.2 | θ9 = 0.546 |
| R16 = −81.165 | D16 = Variable | | | |
| R17 = Aperture | D17 = 1.90 | | | |
| R18 = −108.532 | D18 = 1.40 | N10 = 1.882997 | ν10 = 40.8 | θ10 = 0.567 |
| R19 = 97.644 | D19 = 2.38 | | | |
| R20 = −39.019 | D20 = 1.10 | N11 = 1.762001 | ν11 = 40.1 | θ11 = 0.577 |
| R21 = 22.842 | D21 = 5.50 | N12 = 1.846660 | ν12 = 23.8 | θ12 = 0.620 |
| R22 = −85.358 | D22 = 1.23 | | | |
| R23 = ∞ | D23 = Variable | | | |
| R24 = 32.731 | D24 = 8.50 | N13 = 1.496999 | ν13 = 81.5 | θ13 = 0.538 |
| R25 = −21.203 | D25 = 1.20 | N14 = 1.846660 | ν14 = 23.9 | θ14 = 0.620 |
| R26 = −33.424 | D26 = 0.20 | | | |
| R27 = 489.958 | D27 = 1.20 | N15 = 1.834000 | ν15 = 37.2 | θ15 = 0.578 |
| R28 = 21.019 | D28 = 6.95 | N16 = 1.496999 | ν16 = 81.5 | θ16 = 0.538 |
| R29 = −107.327 | D29 = 0.20 | | | |
| R30 = 216.223 | D30 = 2.90 | N17 = 1.677900 | ν17 = 55.3 | θ17 = 0.547 |
| *R31 = −123.349 | | | | |

| | Focal Length | | |
|---|---|---|---|
| Variable Distance | 16.53 | 24.17 | 33.94 |
| D9 | 26.19 | 10.54 | 1.51 |
| D16 | 0.19 | 5.32 | 10.67 |
| D23 | 9.66 | 5.53 | 0.18 |

Aspherical Coefficients

| | | | |
|---|---|---|---|
| 1st Surface: | A = 0.00000e+00 | B = 1.57133e−05 | C = −2.58772e−08 |
| | D = 3.58588e−11 | E = −2.62578e−14 | F = 7.14346e−18 |
| 2nd Surface: | A = 0.00000e+00 | B = −5.31774e−07 | C = −5.35127e−09 |
| | D = −1.74132e−11 | E = 7.14717e−14 | F = 0.00000e+00 |
| 5th Surface: | A = 0.00000e+00 | B = 1.82267e−05 | C = 2.52705e−10 |
| | D = −1.00959e−10 | E = 3.20814e−13 | F = −5.12453e−16 |
| 31st Surface: | A = 0.00000e+00 | B = 6.88338e−06 | C = −1.74483e−09 |
| | D = 4.61203e−11 | E = −3.35510e−15 | F = −3.44751e−16 |

TABLE 2

| Lens Unit | f |
|---|---|
| 1 | −22.82 |
| 2 | 31.07 |
| 3 | −45.25 |
| 4 | 46.51 |

Second Numerical Example

TABLE 3

|  | | | |
|---|---|---|---|
| f | 16.5 | 24.1 | 33.9 |
| F-number | 2.9 | 2.9 | 2.9 |
| Field Angle 2ω | 105.2 | 83.7 | 65.0 |
| Image Height | 21.6 | 21.6 | 21.6 |
| Lens Length | 113.3 | 98.7 | 89.7 |
| BF | 38.5 | 45.5 | 55.2 |

| | | | | |
|---|---|---|---|---|
| *R1 = 302.188 | D1 = 2.40 | N1 = 1.772499 | ν1 = 49.6 | θ1 = 0.552 |
| *R2 = 21.853 | D2 = 9.23 | | | |
| R3 = 180.071 | D3 = 1.60 | N2 = 1.772499 | ν2 = 49.6 | θ2 = 0.552 |
| R4 = 35.664 | D4 = 0.16 | N3 = 1.516400 | ν3 = 52.2 | θ3 = 0.557 |
| *R5 = 45.853 | D5 = 5.54 | | | |
| R6 = −87.571 | D6 = 1.60 | N4 = 1.438750 | ν4 = 95.0 | θ4 = 0.534 |
| R7 = 76.295 | D7 = 0.15 | | | |
| R8 = 41.899 | D8 = 4.50 | N5 = 1.749500 | ν5 = 35.3 | θ5 = 0.552 |
| R9 = 286.166 | D9 = Variable | | | |
| R10 = 53.724 | D10 = 1.00 | N6 = 1.805181 | ν6 = 25.4 | θ6 = 0.563 |
| R11 = 24.402 | D11 = 5.40 | N7 = 1.540720 | ν7 = 47.2 | θ7 = 0.565 |
| R12 = −374.414 | D12 = 0.15 | | | |
| R13 = 99.769 | D13 = 2.55 | N8 = 1.772499 | ν8 = 49.6 | θ8 = 0.552 |
| R14 = −202.964 | D14 = 4.58 | | | |
| R15 = 59.805 | D15 = 3.80 | N9 = 1.622992 | ν9 = 58.2 | θ9 = 0.546 |
| R16 = −81.518 | D16 = Variable | | | |
| R17 = Aperture | D17 = 1.90 | | | |
| R18 = −110.315 | D18 = 1.40 | N10 = 1.882997 | ν10 = 40.8 | θ10 = 0.567 |
| R19 = 97.902 | D19 = 2.40 | | | |
| R20 = −38.618 | D20 = 1.10 | N11 = 1.762001 | ν11 = 40.1 | θ11 = 0.577 |
| R21 = 23.009 | D21 = 5.50 | N12 = 1.846660 | ν12 = 23.8 | θ12 = 0.620 |
| R22 = −83.804 | D22 = 1.23 | | | |
| R23 = ∞ | D23 = Variable | | | |
| R24 = 32.726 | D24 = 8.50 | N13 = 1.496999 | ν13 = 81.5 | θ13 = 0.538 |
| R25 = −21.203 | D25 = 1.20 | N14 = 1.846660 | ν14 = 23.9 | θ14 = 0.620 |
| R26 = −33.378 | D26 = 0.20 | | | |
| R27 = 567.032 | D27 = 1.20 | N15 = 1.834000 | ν15 = 37.2 | θ15 = 0.578 |
| R28 = 20.909 | D28 = 6.95 | N16 = 1.496999 | ν16 = 81.5 | θ16 = 0.538 |
| R29 = −107.978 | D29 = 0.20 | | | |
| R30 = 208.203 | D30 = 2.90 | N17 = 1.677900 | ν17 = 55.3 | θ17 = 0.547 |
| *R31 = −123.589 | | | | |

| | Focal Length | | |
|---|---|---|---|
| Variable Distance | 16.53 | 24.21 | 33.91 |
| D9 | 26.31 | 10.54 | 1.51 |
| D16 | 0.11 | 5.32 | 10.67 |
| D23 | 9.55 | 5.53 | 0.18 |

Aspherical Coefficients

| | | | |
|---|---|---|---|
| 1st Surface: | A = 0.00000e+00 | B = 1.58712e−05 | C = −2.57625e−08 |
| | D = 3.58360e−11 | E = −2.95313e−14 | F = 1.04808e−17 |
| 2nd Surface: | A = 0.00000e+00 | B = −3.16508e−07 | C = −8.41156e−09 |
| | D = 1.60037e−11 | E = −1.35104e−14 | F = 0.00000e+00 |
| 5th Surface: | A = 0.00000e+00 | B = 1.79467e−05 | C = 4.22926e−10 |
| | D = −1.14111e−10 | E = 2.92671e−13 | F = −3.20951e−16 |
| 31st Surface: | A = 0.00000e+00 | B = 6.86690e−06 | C = −2.39168e−10 |
| | D = 2.48158e−11 | E = 1.00078e−13 | F = −5.30814e−16 |

TABLE 4

| Lens Unit | f |
|---|---|
| 1 | −22.86 |
| 2 | 31.03 |
| 3 | −45.53 |
| 4 | 46.87 |

Third Numerical Example

TABLE 5

| | | | |
|---|---|---|---|
| f | 16.5 | 21.2 | 34 |
| F-number | 2.9 | 2.9 | 2.9 |
| Field Angle 2ω | 105.2 | 91.1 | 64.9 |
| Image Height | 21.6 | 21.6 | 21.6 |
| Lens Length | 112.8 | 98.3 | 89.2 |
| BF | 38.7 | 45.6 | 55.5 |

| | | | | |
|---|---|---|---|---|
| *R1 = 288.060 | D1 = 2.20 | N1 = 1.772499 | ν1 = 49.6 | θ1 = 0.552 |
| *R2 = 21.847 | D2 = 9.23 | | | |
| R3 = 179.064 | D3 = 1.60 | N2 = 1.772499 | ν2 = 49.6 | θ2 = 0.552 |
| R4 = 35.728 | D4 = 0.16 | N3 = 1.516400 | ν3 = 52.2 | θ3 = 0.557 |
| *R5 = 45.896 | D5 = 5.55 | | | |
| R6 = −87.955 | D6 = 1.60 | N4 = 1.438750 | ν4 = 95.0 | θ4 = 0.534 |
| R7 = 77.176 | D7 = 0.15 | | | |
| R8 = 41.548 | D8 = 4.20 | N5 = 1.720467 | ν5 = 34.7 | θ5 = 0.583 |
| R9 = 302.524 | D9 = Variable | | | |
| R10 = 53.939 | D10 = 1.00 | N6 = 1.805181 | ν6 = 25.4 | θ6 = 0.563 |
| R11 = 24.342 | D11 = 5.40 | N7 = 1.540720 | ν7 = 47.2 | θ7 = 0.565 |
| R12 = −379.700 | D12 = 0.15 | | | |
| R13 = 98.598 | D13 = 2.55 | N8 = 1.772499 | ν8 = 49.6 | θ8 = 0.552 |
| R14 = −203.219 | D14 = 4.58 | | | |
| R15 = 59.105 | D15 = 3.80 | N9 = 1.622992 | ν9 = 58.2 | θ9 = 0.546 |
| R16 = −80.720 | D16 = Variable | | | |
| R17 = Aperture | D17 = 1.90 | | | |
| R18 = −108.231 | D18 = 1.40 | N10 = 1.882997 | ν10 = 40.8 | θ10 = 0.567 |
| R19 = 96.824 | D19 = 2.41 | | | |
| R20 = −38.412 | D20 = 1.10 | N11 = 1.762001 | ν11 = 40.1 | θ11 = 0.577 |
| R21 = 22.989 | D21 = 5.50 | N12 = 1.846660 | ν12 = 23.8 | θ12 = 0.620 |
| R22 = −84.335 | D22 = 1.23 | | | |
| R23 = ∞ | D23 = Variable | | | |
| R24 = 32.620 | D24 = 8.50 | N13 = 1.496999 | ν13 = 81.5 | θ13 = 0.538 |
| R25 = −21.180 | D25 = 1.20 | N14 = 1.846660 | ν14 = 23.9 | θ14 = 0.620 |
| R26 = −33.328 | D26 = 0.20 | | | |
| R27 = 536.674 | D27 = 1.20 | N15 = 1.834000 | ν15 = 37.2 | θ15 = 0.578 |
| R28 = 20.978 | D28 = 6.95 | N16 = 1.496999 | ν16 = 81.5 | θ16 = 0.538 |
| R29 = −107.980 | D29 = 0.20 | | | |
| R30 = 209.444 | D30 = 2.90 | N17 = 1.677900 | ν17 = 55.3 | θ17 = 0.547 |
| *R31 = −122.514 | | | | |

| | Focal Length | | |
|---|---|---|---|
| Variable Distance | 16.48 | 24.19 | 34.01 |
| D9 | 26.31 | 10.54 | 1.51 |
| D16 | 0.11 | 5.32 | 10.67 |
| D23 | 9.55 | 5.53 | 0.18 |

| | | | |
|---|---|---|---|
| 1st Surface: | A = 0.00000e+00 | B = 1.61425e−05 | C = −2.56938e−08 |
| | D = 3.58029e−11 | E = −2.96463e−14 | F = 1.05468e−17 |
| 2nd Surface: | A = 0.00000e+00 | B = −4.20003e−07 | C = −8.13666e−09 |
| | D = 2.06654e−11 | E = −1.54090e−14 | F = 0.00000e+00 |
| 5th Surface: | A = 0.00000e+00 | B = 1.81457e−05 | C = 1.54225e−09 |
| | D = −1.21902e−10 | E = 2.80858e−13 | F = −2.51610e−16 |
| 31st Surface: | A = 0.00000e+00 | B = 6.92791e−06 | C = −3.05818e−10 |
| | D = 3.43712e−11 | E = 3.97409e−14 | F = −3.78651e−16 |

TABLE 6

| Lens Unit | f |
|---|---|
| 1 | −22.77 |
| 2 | 30.87 |
| 3 | −44.66 |
| 4 | 46.44 |

TABLE 7

| Conditional Expression | 1st Example | 2nd Example | 3rd Example |
|---|---|---|---|
| (1) ν1n | 81.50 | 94.99 | 94.99 |
| (2) θ1n − (0.651 − 0.00168 · ν1n) | 0.02 | 0.04 | 0.04 |
| (3) ν1p | 35.33 | 35.33 | 34.70 |
| (4) θ1p − (0.644 − 0.00168 · ν1p) | −0.03 | −0.03 | −0.01 |
| (5) N1p − 1.77 | −0.02 | −0.02 | −0.05 |
| (6) \|f1/fw\| | 1.38 | 1.38 | 1.38 |
| (7) ν4p | 81.50 | 81.50 | 81.50 |
| (8) θ4p − (0.651 − 0.00168 · ν4p) | 0.02 | 0.02 | 0.02 |
| (9) \|f1/f2\| | 0.73 | 0.74 | 0.74 |
| (10) fw/f4 | 0.36 | 0.35 | 0.35 |

Next, a single-lens reflex camera system including a zoom lens (optical system) according to the present invention will be described with reference to FIG. 10. Referring to FIG. 10, a single-lens reflex camera 10 includes an interchangeable lens 11 including a zoom lens according to the present invention.

A recording unit 12, such as a film or a solid-state image pickup element, records (receives) an object image obtained through the interchangeable lens 11. A finder optical system 13 allows a user to observe the object image obtained through the interchangeable lens 11.

A quick return mirror 14 is provided in a pivotable manner so that the quick return mirror 14 can transmit the object image obtained through the interchangeable lens 11 to one of the recording unit 12 and the finder optical system 13.

In the case where the object image is observed through a finder, the object image is formed on a focusing screen 15 through the quick return mirror 14, is formed into an erect image by a pentaprism 16, and is magnified by an ocular optical system 17 so that the object image can be observed.

In a shooting operation, the quick return mirror 14 is pivoted in the direction shown by the arrow and the object image is formed on the recording unit 12 and is recorded. A sub-mirror 18 and a focal-point detecting device 19 are also provided.

When the zoom lens according to the present invention is included in an image pickup apparatus, such as an interchangeable lens for a single-lens reflex camera, an image pickup apparatus which provides high optical performance can be obtained.

The present invention may also be applied to a single lens reflex (SLR) camera that is free from the quick return mirror.

As described above, according to the embodiments of the present invention, a small zoom lens having high optical performance which is suitable for use in an imaging system including a solid-state image pickup element can be provided. In addition, an image pickup apparatus including the zoom lens can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-014824 filed Jan. 25, 2008, which is hereby incorporated by reference herein in its entirety.

What is claimed is:

1. A zoom lens comprising:
a first lens unit having a negative refractive power;
a second lens unit having a positive refractive power;
a third lens unit having a negative refractive power; and
a fourth lens unit having a positive refractive power,
wherein the first lens unit, the second lens unit, the third lens unit, and the fourth lens unit are arranged in order from the object side to the image side,
wherein, a distance between the first lens unit and the second lens unit at the telephoto end is smaller than that at the wide-angle end, a distance between the second lens unit and the third lens unit at the telephoto end is larger than that at the wide-angle end, and a distance between the third lens unit and the fourth lens unit at the telephoto end is smaller than that at the wide-angle end, and
wherein the following conditions are satisfied:

$$\nu 1n > 70$$

$$\theta 1n - (0.651 - 0.00168 \cdot \nu 1n) > 0$$

$$25 < \nu 1p < 50$$

$$\theta 1p - (0.644 - 0.00168 \cdot \nu 1p) < 0$$

$$-0.2 < N1p - 1.77 < 0$$

$$1.2 < |f1/fw| < 1.6$$

where ν1n and θ1n are an Abbe number and a partial dispersion ratio, respectively, of a material of at least one negative lens included in the first lens unit, ν1p, θ1p, and N1p are an Abbe number, a partial dispersion ratio, and a refractive index, respectively, of a material of at least one positive lens included in the first lens unit, f1 is a focal length of the first lens unit, and fw is a focal length of the entire zoom lens at the wide-angle end.

2. The zoom lens according to claim 1, wherein the following conditions are satisfied:

$$\nu 4p > 75$$

$$\theta 4p - (0.651 - 0.00168 \cdot \nu 4p) > 0$$

where ν4p and θ4p are an Abbe number and a partial dispersion ratio, respectively, of a material of at least one positive lens included in the fourth lens unit.

3. The zoom lens according to claim 1, wherein the following condition is satisfied:

$$0.4 < |f1/f2| < 0.9$$

wherein f1 and f2 are focal lengths of the first lens unit and the second lens unit, respectively.

4. The zoom lens according to claim 1, wherein the first lens unit has an aspherical lens surface such that the negative refractive power decreases from the center of a lens of the first lens unit toward the periphery thereof.

5. The zoom lens according to claim 1, wherein the fourth lens unit has an aspherical lens surface such that the negative refractive power decreases from the center of a lens of the fourth lens unit toward the periphery thereof, and
wherein the following condition is satisfied:

$$0.2 < fw/f4 < 0.5$$

where f4 is a focal length of the fourth lens unit, and fw is the focal length of the entire zoom lens at the wide-angle end.

6. The zoom lens according to claim 1, wherein the first lens unit includes a negative lens, a negative lens, a negative lens, and a positive lens arranged in order from the object side to the image side.

7. An image pickup apparatus comprising:
the zoom lens according to claim 1; and
a solid-state image pickup element which receives an image formed by the zoom lens.

* * * * *